(12) United States Patent
Kambli et al.

(10) Patent No.: US 9,088,659 B2
(45) Date of Patent: Jul. 21, 2015

(54) METHOD AND APPARATUS FOR PROVISIONING CONTACT HANDLING RESOURCES IN A CONTACT CENTER

(75) Inventors: Rajiv Kambli, Cupertino, CA (US); Senthilvel Saravanan, San Jose, CA (US); Krishnakumar Pandurangan, San Jose, CA (US); Jim Miller, Lombard, IL (US)

(73) Assignee: ASPECT SOFTWARE, INC., Chelmsford, MA (US)

( * ) Notice: Subject to any disclaimer, the term of this patent is extended or adjusted under 35 U.S.C. 154(b) by 1168 days.

(21) Appl. No.: 12/258,618

(22) Filed: Oct. 27, 2008

(65) Prior Publication Data

US 2009/0129581 A1  May 21, 2009

Related U.S. Application Data

(60) Provisional application No. 60/988,235, filed on Nov. 15, 2007.

(51) Int. Cl.
*H04M 3/00* (2006.01)
*H04M 3/523* (2006.01)

(52) U.S. Cl.
CPC .......... *H04M 3/5237* (2013.01); *H04M 3/5234* (2013.01); *H04M 2201/22* (2013.01)

(58) Field of Classification Search
CPC . H04M 3/5158; H04M 3/5183; H04M 3/523; H04M 3/5237; H04M 3/5175; H04M 3/5191; H04M 3/5166
USPC ............... 379/265.01, 256.1, 265.12, 266.07, 379/266.04
See application file for complete search history.

(56) References Cited

U.S. PATENT DOCUMENTS

| | | | |
|---|---|---|---|
| 7,647,463 B2 * | 1/2010 | Jarvis et al. | 711/162 |
| 7,711,104 B1 * | 5/2010 | Flockhart et al. | 379/265.03 |
| 2004/0122717 A1 * | 6/2004 | Hancock | 705/4 |
| 2007/0299680 A1 * | 12/2007 | Fama et al. | 705/1 |
| 2009/0083342 A1 * | 3/2009 | Tomic et al. | 707/204 |
| 2010/0128720 A1 * | 5/2010 | Goss | 370/352 |

* cited by examiner

*Primary Examiner* — Rasha Al Aubaidi
(74) *Attorney, Agent, or Firm* — Husch Blackwell LLP

(57) ABSTRACT

A method and apparatus are provided for provisioning call handling resources in a contact handling system. The method includes the steps of identifying a call handling resource within a first contact center, copying call handling data associated with the identified contact handling resource and writing the call handling data into a contact handling structure of a second contact center.

27 Claims, 3 Drawing Sheets

METHOD AND APPARATUS FOR PROVISIONING CONTACT HANDLING RESOURCES IN A CONTACT CENTER

FIELD OF THE INVENTION

The field of the invention relates to communication systems and more particularly to contact centers.

BACKGROUND OF THE INVENTION

Contact centers are generally known. Contact centers are typically used wherever an organization has occasion to handle a multitude of individual calls with clients. Usually, the organization will hire a number of agents to interact with its clients.

Contacts between the organization and clients may be handled under any of a number of different communication mediums. For example, contacts may be initiated by clients through the public switch telephone network (PSTN) by a client calling a telephone number provided by the organization. Alternatively, the organization may place telephone calls to its clients. In either case, connection of the telephone call with an agent may be handled by an automatic call distributor (ACD).

Similarly, contacts with clients through the Internet may be handled by a host of a contact center. Contacts in this case may be handled under a voice format (e.g., VoIP) or under a text format (e.g., e-mail, chat, etc.).

Once a contact is detected, the ACD may select an agent to handle the call. The agent may be selected based upon the agent's qualifications in handling the type of contact involved, based upon experience with the client involved or based upon idle time. Once an agent is selected, the ACD may automatically route the contact to a telephone or desktop of the selected agent.

As the contact is delivered to the agent, a host of the contact center may retrieve any records associated with previous contacts with the client and deliver those records to the selected agent as a screen pop at the same instant that the contact is delivered. If the host can determine a purpose of the call, the host may also display text on the terminal of the selected agent containing a message to be delivered to the client.

While contact centers work relatively well, the loading of contact centers in terms of contacts processed is often fluid. The rate of contacts arriving within any one contact center of a contact center system may often change radically over a very short time period. Often the change in loading requires that supervisory personnel frequently reconfigure the way that contact center system handle contacts. Accordingly, a need exists for better ways of allowing contact centers to adapt to changing loading levels.

SUMMARY

A method and apparatus are provide for provisioning call handling resources in a contact handling system. The method includes the steps of identifying a call handling resource within a first contact center, copying call handling data associated with the identified contact handling resource and writing the call handling data into a contact handling structure of a second contact center.

DETAILED DESCRIPTION OF AN ILLUSTRATED EMBODIMENT

Figure 1:
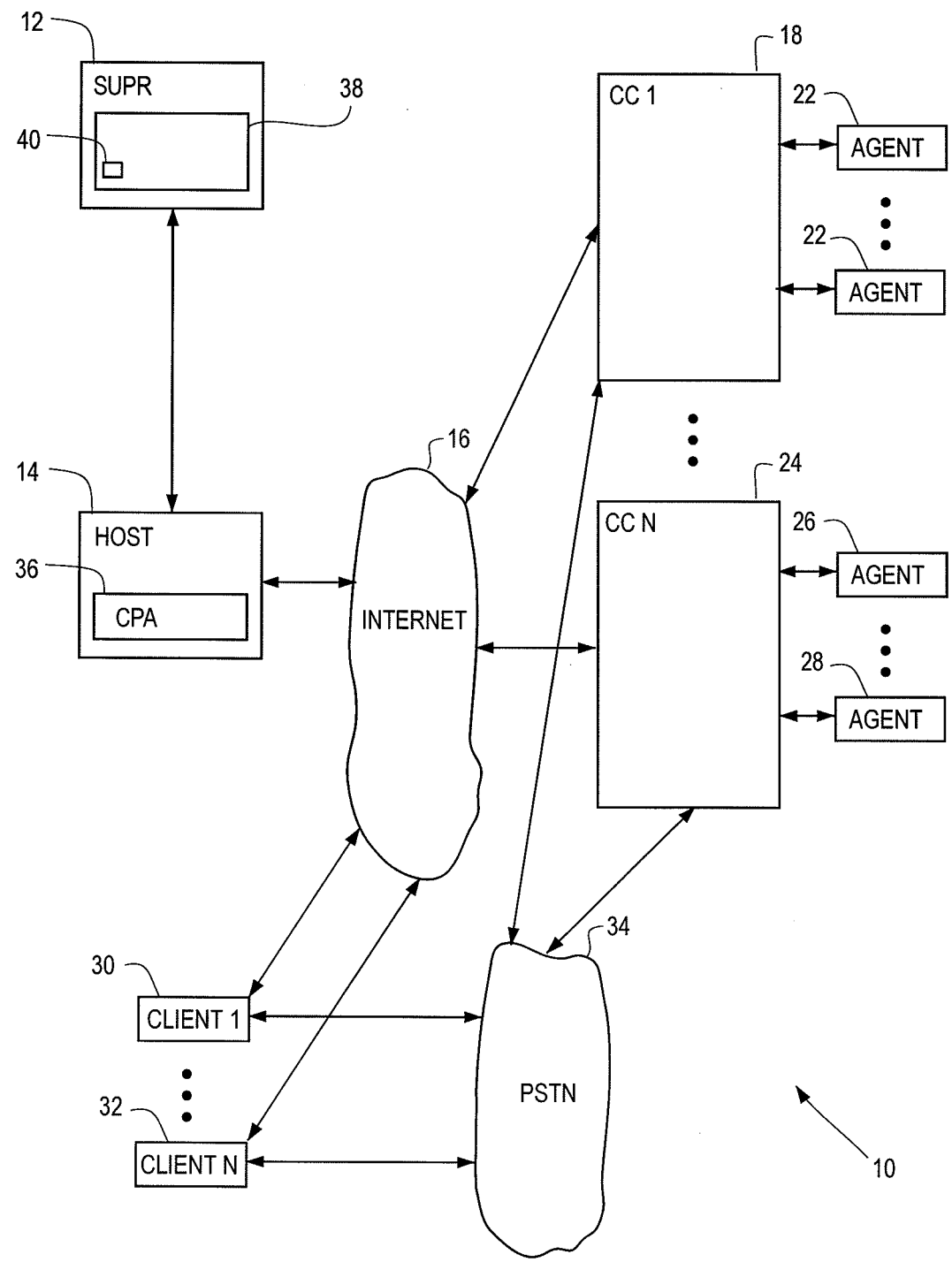
FIG. 1 depicts a contact center system in accordance with an illustrated embodiment of the invention.

FIG. 1 is a block diagram of an automatic contact distribution system 10 shown generally in accordance with an illustrated embodiment of the invention. Included within the contact distribution system 10 may be one or more automatic contact distributors (ACDs) 18, 24. Associated with each of the ACDs 18, 24 may be a number of agents 20, 22, 26, 28.

Each of the agents 20, 22, 26, 28 may be connected to a respective ACD 18, 24 via one or more communication networks. For example, the agents 20, 22, 26, 28 may be provided with a telephone for voice conversations and a desktop interface operating on a computer (e.g., a personal computer (PC)) for data exchanges. Alternatively, the agents 20, 22, 26, 28 may be connected to the ACD 18, 24 using a single network (e.g., a computer network) and use their computer alone for voice and data exchanges with clients 30, 32, other agents 20, 22, 26, 28 or other co-workers using an appropriate communication medium (e.g., VoIP, e-mail, chat, etc.).

Each agent may be provided with a class of service that controls how each agent uses the communication networks. At least some elements of an agent's class of service are selected by the agent's supervisor (e.g., whether the agent is able to make local or long distance calls, what databases an agent is allowed to access, etc.). At least some other elements may be selected by an agent (e.g., how an agent wraps up calls with clients, whether new calls are routed to the agent automatically when the agent terminates a current call, etc.).

Figure 2:
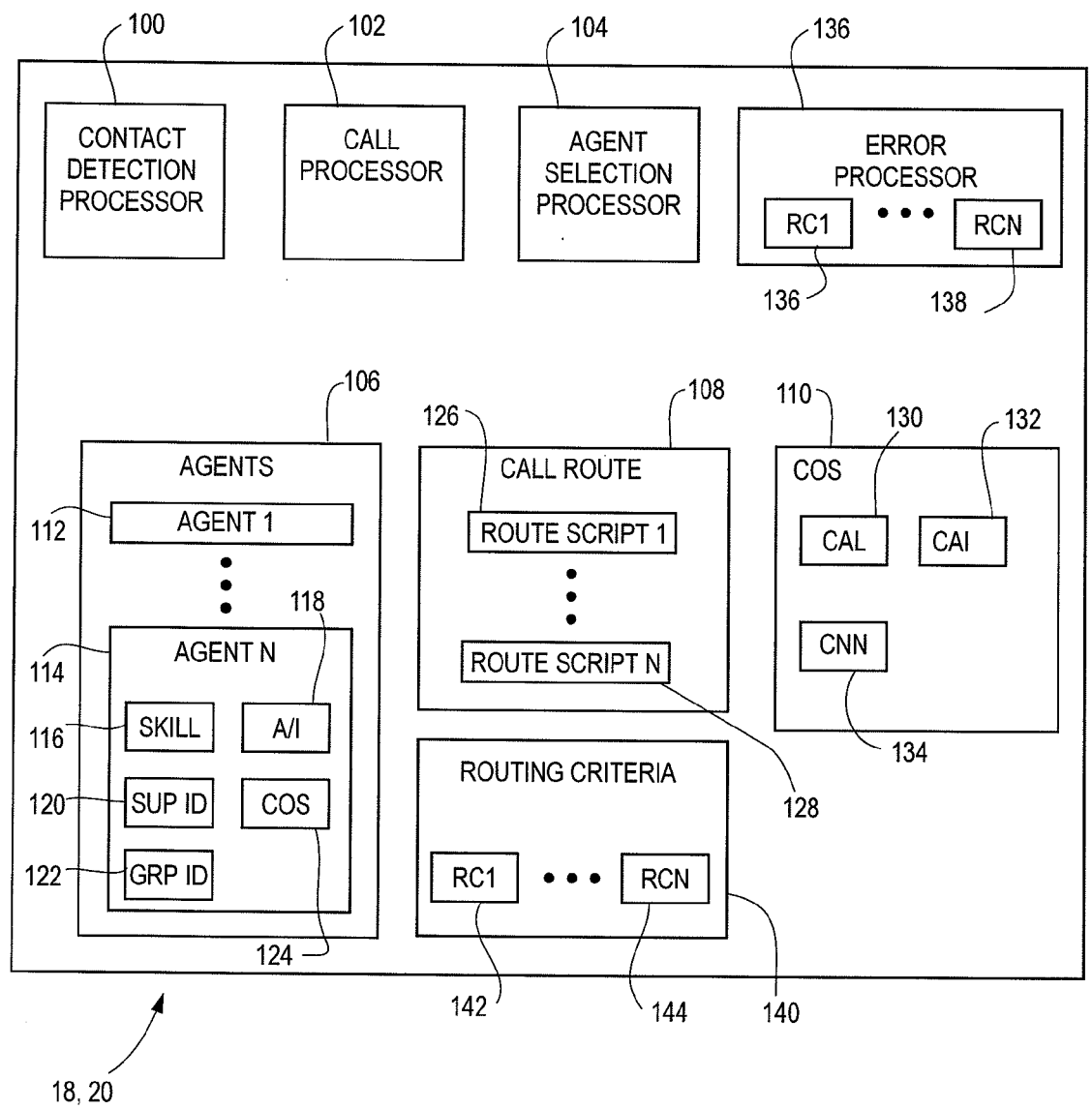
FIG. 2 depicts an ACD that may be used with the system of FIG. 1.

The ACDs 18, 24 may be connected to the public switch telephone network (PSTN) 34 through one or more switched circuit connections (e.g., trunk lines) and may receive contacts from and place contacts to a telephone and/or desktop 30, 32 of clients through the PSTN 34. In the case of incoming contacts, a contact detection processor 100 (FIG. 2) may detect the arrival of a contact and collect contact associated information (e.g., DNIS, ANI, etc.) about the contact in anticipation of answering the contact. The contact detection processor 100 may transfer any collected contact associated information to a contacts processor 102 that selects an appropriate contact routing application (e.g., call handling script) based upon one or more call routing criteria 142, 144. In the case of outgoing calls, the contact detection processor 100 receives contact associated information (e.g., purpose of the contact, identity of the call target, etc.) from a separate program that initiates the outgoing call.

The ACDs 18, 24 may also be connected to the Internet 16 through one or more high speed connections. Contacts through the Internet 16 (e.g., e-mails, chat, VoIP, etc.) may be handled in a similar manner. Collected contact associated information in this case may include a destination and source addresses for e-mails or destination and source URLs for chat messages. As with telephone calls, the contact detection processor 100 may collect any contact associated information and forward the information to the contact processor 102.

The contact processor 102 may receive the contact associated information, classify the call in accordance with the contact associated information and select an appropriate contact script 126, 128 to route the contact. The selected routing application 126, 128 may route the contact to an agent of an agent group, to an automatic attendant or even to another ACD 18, 24.

When routed to an agent group, an agent selection processor 104 may select an agent to handle the contact based upon the contact classification and any appropriate criteria (e.g., agent skill or availability, the purpose of the contact, the identity of the client, etc.). In the case of outgoing telephone calls or e-mails, the purpose of the contact may be known a priori by the organization using the contact distribution system 10. For example, the purpose of the contact may be a public awareness campaign organized by the organization and may be directed to some predetermined subject matter. In this case the agent selection processor 104 may select an agent based upon knowledge of the subject matter.

In the case of incoming contacts, the purpose of the contact may be determined by the ACD system 10 from the number dialed or Internet address used by the client 30, 32 in initiating the contact. For example, the organization using the ACD system 10 may subscribe to a number of different telephone numbers where each telephone number is used for a different purpose.

Alternatively, the agent selection processor 104 may select an agent 20, 22, 26, 28 based upon the identity of the client 30, 32. In this case, the identity of the client 30, 32 may be determined from ANI information or an Internet source URL delivered along with the contact.

The agent selection processor 104 may search an agent list based upon the call classification and selection criteria. When a match is found, the agent selection processor 104 may route the contact to the agent 20, 22, 26, 28.

In addition, the agent selection processor 104 may send an identifier of the selected agent and contact associated information to a host of the system 10. The host may retrieve any customer records and display the records on a desktop of the agent 20, 22, 26, 28 as a screen pop at the same instant as the contact is delivered.

Overall control of the ACD system 10 may be accomplished by a supervisor working through a supervisors terminal 12 connected to a host 14. The host 14, in turn, may connected to the various ACDs 18, 24 through the Internet.

Various management applications within the host 14 and ACDs 18, 24 may allow the supervisor 12 to monitor contact processing within the ACDs 18, 24. For example, a force management package may predict an expected contact arrival rate of contacts (by contact classification) based upon historical records. Other work force management applications may monitor the actual arrival rate and the performance of the various agent groups. Performance information available to the supervisor 12 from the ACDs 18, 24 may include any number of contact handling metrics (e.g., an average time to respond to a contact, a queue length for each queue, number of agent groups, agents in each group, the identity of the agents in each agent group, etc.).

The supervisor 12 may monitor the ACDs 18, 24 and make changes as necessary. For example, if a particular agent group in an ACD (e.g., ACD 18) is overloaded (e.g., the time in queue of clients 30, 32 exceeds some threshold value) and another agent group in the ACD 18 is underutilized, then the supervisor 12 may transfer agents from the overloaded group to the underutilized group. Similarly, if the agent groups are underutilized as a whole, the supervisor 12 may activate some outdialing or e-mail sending application that initiates new contacts with clients 30, 32 in order to better utilized the agent groups.

Under one illustrated embodiment of the invention, the supervisor 12 is provided with a provisioning application 36 that copies call handling resource data among ACDs 18, 24. Call handling resource data may include structurally related data or programming that is used in support of contact processing (e.g., contact handling scripts, agent data, agent group data, contact handling criteria, class of service information, etc.).

The difficulty of copying call handling resource data is that it does not exist as a single file, but instead may exist in a number of different locations in different formats. For example, call handling scripts may exist in any number of different locations, indexed by a call classification. Similarly, agent data may exist in the form of a skill list for each agent, a group affiliation, an identifier of a supervisor, a class of service, etc. Class of service data may exist in its original form, but also exists in a modified form where used by and associated with each agent.

The ability to perform bulk copying of call handling resource data is important not only for the start up of new ACDs 18, 24 but also because it increases the flexibility of operation of an ACD 18, 24. However, not all of the call handling resource data can exist on any one ACD 18, 24 because of the volume of memory required. As a result, the ability to perform bulk copying of call handling resource data among ACDs 18, 24 can be an important resource is improving flexibility.

For example, a first ACD (e.g., 18) may process a high number or percentage of contacts of a first contact classification or contact type based upon the geographic region in which it is located whereas a second ACD (e.g., 24) has a low percentage of that first contact type because it is in a different geographic area. Within the first ACD 18, agents 20 and 22 may be included within an agent group (e.g., agent group A1) assigned to handling the first type contacts while within the second ACD 24 only agent 26 may be assigned to the agent group (e.g., agent group A2) that handles the first contact type.

However, occasionally, the volume of contacts of the first contact type processed by the second ACD 24 may exceed some minimum threshold level and it may be necessary to transfer at least some of the agents (e.g., 20) from agent group A1 to agent group A2 of the second ACD 24. In this case, transfer simply means that the agent 20 receives calls through the ACD 24 even though the agent 20 remains physically connected to the original ACD 18. The physical connection of the agent 20 to the ACD 24 may occur through an intranet or Internet connection.

Figure 3:
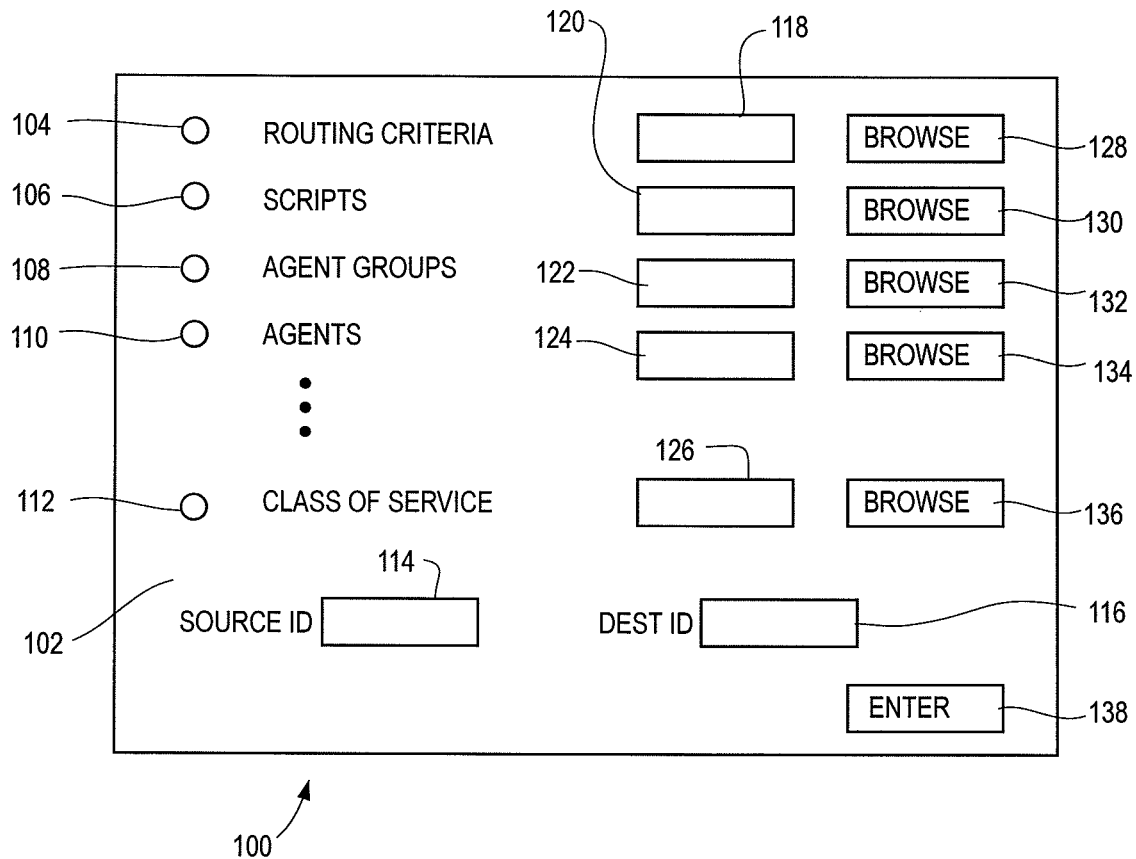
FIG. 3 depicts a copy screen that may be used with the system of FIG. 1.

In order for the agent 20 to receive calls through the ACD 24, the ACD 24 must be provisioned with the call handling resources necessary to support routing calls to the agent 20. In order to provision the ACD 24, the supervisor 12 may activate an icon 40 on a screen 38 of the supervisors terminal 12 to activate the application 36. In response, the provisioning application 36 may download the resource copy screen 100 (FIG. 3) to the supervisors station 12.

Included within the resource copy screen 100 may be a listing 102 identifers of types of contact handling resources that could be copied from a source ACD to a destination ACD along with a respective softkey 104, 106, 108, 110, 112 associated with each type of contact handling resource. Associated with each softkey 104, 106, 108, 110, 112 may be an interactive box 118, 120, 122, 124, 126 for entry of an identifier of the particular call handling resource.

A BROWSE softkey 128, 130, 132, 134, 136 may be associated with each resource. In this case, the supervisor 12 may select a resource softkey 104, 106, 108, 110, 112 and then the associated BROWSE softkey 128, 130, 132, 134, 136 to view a list of resources of that type. Upon viewing the different resources associated with the selected resource, the supervisor 12 may select a resource and, in response, the identifier of the selected resource may be automatically entered into the respective box 118, 120, 122, 124, 126.

In the case at hand, if the supervisor 12 were to want to copy agent data related to the agent 20 from the first ACD 18 to the second ACD 24, then the supervisor 12 may activate the agent softkey 110. The supervisor 12 may enter an identifier of the agent 20 or activate the BROWSE softkey 134. In response, the computer 12 may display a list of agents. The supervisor 12 may select the agent 20 or enter an identifier of the agent 20 in the box 124. The supervisor may enter an identifier of the source ACD 18 in the box 114, an identifier of the destination ACD 24 in the destination box 116 and activate an ENTER softkey 138.

Figure 4:
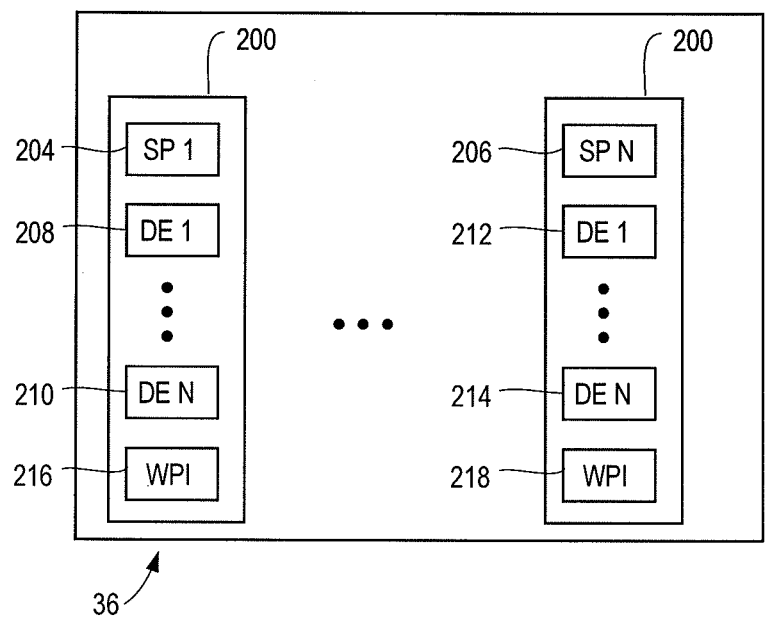
FIG. 4 depicts a software structure that may be used with the system of FIG. 1.

Included within the application 36 may be a number of resource specific copying processor or subprocessors 200, 202 (FIG. 4). Each copying processor 200, 202 may be associated with a respective resource copy softkey 104, 106, 108, 110, 112.

Each copying processor 200, 202 may also include a specific respective copy segment processing module 204, 206 and a set of resource copying attributes 208, 210, 212, 214. Each copying attribute may, in fact, function as an object oriented pointer that may be used to retrieve a specific type of resource data.

For example, in the case of the supervisor 12 copying agent data from the ACD 18 to the ACD 24, a first copying attribute 208, 210, 212, 214 may be an object that is used in conjunction with the identifier of the source ACD 18 to identify agent data files 106 (FIG. 2) within the source ACD 18. A second attribute 208, 210, 212, 214 may be used in conjunction with the identifier of the agent 20 to identify a location of a portion 114 of data maintained for the agent 20 within the ACD 18. A third attribute 208, 210, 212, 214 may be used in conjunction with the identifier of the agent 20 to identify a location of a data portion 116 containing skills data maintained for agent 20 within the ACD 18. Other data attributes 208, 210, 212, 214 may be used in conjunction with the identifier of the agent 20 to identify respective locations of portions 118, 120, 122, 124 of an agent availability, a supervisor identifier, a group ID for the agent 20 and a class of service for agent 20.

Using the attributes 208, 210, 212, 214, the processor 202, 204 may copy the agent data from the source ACD 18. Other attributes 208, 210, 212, 214 may be used in conjunction with the identifier of the destination ACD 24 by a write processor 216, 218 to write the data into a corresponding location 106, 114 within the destination ACD 24.

Within the destination ACD 24, an error processor 136 may compare the contact handling data written into the respective files 106, 114 with a set of contact handling criteria 136, 138. The contact handling criteria 136, 138 may contain a set of resource identifiers and a set of ranges for each resource file copied from the source ACD 18 to the destination ACD 24. If the error processor 136 should detect a discrepancy, then the error processor 136 may notify the supervisor 12 of any additional changes.

For example, if the call handling data of the agent 20 should have a class of service 124 that is unknown to the destination ACD 24, then the error processor 136 would identify the unknown class of service and notify the supervisor 12. In response, the supervisor 12 may activate the copy class of service softkey 112, identify the unknown class of service file and copy it into the destination ACD 24. The supervisor 12 may copy the individual unknown file class of service 130, 132, 134 and write it into the destination class of service file 110 of the destination ACD 24.

In another example, a second contact classification may be processed by the second ACD 24, but not by the first ACD 18. In this case, the supervisor 12 may copy the contact handling resources necessary for handling the second contact handling resources from the second ACD 24 into the first ACD 18.

In order to copy the call handling resources, the supervisor 12 may activate a scripts softkey 106 and select one or more scripts 126, 128 for copying into the destination ACD 18. Upon selecting one or more scripts 126, 128, the supervisor 12 may enter an identifier of a source ACD 24 and a destination ACD 18 is respective fields 114, 116 and activate the ENTER softkey 138.

In response, the resource copying processor 200, 202, may activate one or more copy segment processing modules 204, 206 that, in turn, may copy the respective script 126, 128 under control of the processing attributes 208, 210, 212, 214. The copying processor 200, 202 may copy the routing scripts 126, 128 from the source ACD 24 to the destination ACD 18 as discussed above.

Once copied into the destination ACD 18, the error processor 136 may process the copied files for purposes of detecting any unidentified terms. In this case, the error processor 136 may detect one or more undefined routing criteria 140, 142 and notify the supervisor 12. The supervisor 12, in turn, may select the appropriate routing criteria 140, 142 and copy the routing criteria 140, 142 into the destination ACD 18 as discussed above.

A specific embodiment of method and apparatus for provisioning a call center has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of provisioning call handling resources in a contact handling system comprising:
   identifying to a copying processor a specific call handling resource within a first contact center and identifying to the copying processor a second contact center;
   the copying processor copying call handling data associated with the identified specific contact handling resource from the first contact center through an Internet network, the call handling data from multiple resource files with different formats located in different locations;
   comparing the copied call handling data with a set of call handling criteria including a set of resource identifiers and a set of ranges for the identified specific contact handling resource and generating an error notification and changes to the copied call handling data in response to detecting a discrepancy from the call handling criteria and writing the changes to the second contact center; and
   a writing processor of the second contact center writing the copied call handling data into a contact handling structure of the second contact center from the Internet network and the second contact center using a set of resource copying attributes for writing the copied call handling data into corresponding locations within the second contact center.

2. The method of provisioning call handling resources as in claim 1 further comprising defining the call handling resource as a human agent and the copying processor copying the call handling data from the first contact center using a set of resource copying attributes functioning as object oriented pointers to identify respective locations of respective different portions of the call handling data to be copied.

3. The method of provisioning call handling resources as in claim 2 wherein the call handling data further comprises at least one of the group consisting of agent skills, an agent group of human agents and a geographic location of the human agent and wherein the comparing is performed at the second contact center.

4. The method of provisioning call handling resources as in claim 1 further comprising defining the call handling resource as a contact handling script that routes a contact based upon a predetermined criteria and further comprising detecting unidentified terms in the copied call handling data and, in response, generating a notification to a supervisor.

5. The method of provisioning call handling resources as in claim 4 wherein the predetermined criteria further comprises a DNIS identifier of the contact.

6. The method of provisioning call handling resources as in claim 4 wherein the predetermined criteria further comprises at least one of a source URL of the contact and an ANI identifier of the contact.

7. The method of provisioning call handling resources as in claim 4 wherein the second contact center comprises an automatic contact distributor and wherein a contact classification within the automatic contact distributor is not available in the first contact center further comprising copying a routing script from the automatic contact distributor to the first contact center, detecting undefined routing criteria in the script and generating a notification in response thereto.

8. The method of provisioning call handling resources as in claim 4 wherein the predetermined criteria further comprises an e-mail from the contact.

9. The method of provisioning call handling resources as in claim 4 wherein the contact handling structure further comprises an automatic call distributor and wherein the contact handling script is processed to detect unidentified terms and a notification is generated in response to detecting an undefined criteria.

10. An apparatus for provisioning call handling resources in a contact handling system comprising:
  means for identifying to a copying processor a specific contact handling resource within a first contact center and for identifying a second contact center;
  means for copying call handling data associated with the identified specific contact handling resource from the first contact center to the copying processor through an internet network, the call handling data including multiple resource files with different formats located in different locations;
  means for comparing the copied call handling data with a set of call handling criteria including a set of resource identifiers and a set of ranges for the identified specific contact handling resource and generating an error notification and changes to the copied call handling data in response detecting a discrepancy from the call handling criteria and writing the changes to the second contact center; and
  means for writing the copied call handling data into a contact handling structure of the second contact center from the internet network and using a set of resource copying attributes for writing the copied call handling data into corresponding locations within the second contact center.

11. The apparatus for provisioning call handling resources as in claim 10 further comprising means for defining the call handling resource as a human agent and wherein the copying processor copies the call handling data from the first contact center using the set of resource copying attributes functioning as object oriented pointers to identify respective locations of respective portions of the call handling data to be copied.

12. The apparatus for provisioning call handling resources as in claim 11 wherein the call handling data further comprises at least one of the group consisting of agent skills, an agent group of human agents and a geographic location of the human agent.

13. The apparatus for provisioning call handling resources as in claim 10 further comprising means for defining the call handling resource as a contact handling script that routes a contact based upon a predetermined criteria.

14. The apparatus for provisioning call handling resources as in claim 13 wherein the predetermined criteria further comprises a DNIS identifier of the contact.

15. The apparatus for provisioning call handling resources as in claim 13 wherein the predetermined criteria further comprises an ANI identifier of the contact.

16. The apparatus for provisioning call handling resources as in claim 13 wherein the predetermined criteria further comprises a source URL of the contact.

17. The apparatus for provisioning call handling resources as in claim 13 wherein the predetermined criteria further comprises an e-mail from the contact.

18. The apparatus for provisioning call handling resources as in claim 13 wherein the contact handling structure further comprises an automatic call distributor.

19. An apparatus for provisioning call handling resources in a contact handling system comprising:
  a resource copy screen that identifies a specific contact handling resource within a first contact center and that identifies a second contact center;
  a copying processor that copies from the first contact center call handling data associated with the identified specific contact handling resource through an internet network, the call handling data including multiple resource files with different formats located in different locations;
  an error processor that compares the copied call handling data with a set of call handling criteria including a set of resource identifiers and a set of ranges for the identified specific contact handling resource and that generates an error notification and changes to the copied call handling data in response to detection of a discrepancy from the call handling criteria, and writing the changes to the second contact center; and
  a write processor that writes from the internet network the copied call handling data into a contact handling structure of the second contact center and the second contact center using a set of resource copying attributes to write the copied call handling data into attributes designated locations within the second contact center.

20. The apparatus for provisioning call handling resources as in claim 19 further comprising a first softkey that defines the call handling resource as a human agent and wherein the copying processor copies the call handling data from the first contact center using the set of resource copying attributes functioning as object oriented pointers to identify respective locations of respective portions of the call handling data.

21. The apparatus for provisioning call handling resources as in claim 20 wherein the call handling data further comprises at least one of the group consisting of agent skills, an agent group of human agents and a geographic location of the human agent.

22. The apparatus for provisioning call handling resources as in claim 19 further comprising means for defining the call handling resource as a contact handling script that routes a contact based upon a predetermined criteria.

23. The apparatus for provisioning call handling resources as in claim 22 wherein the predetermined criteria further comprises a DNIS identifier of the contact.

24. The apparatus for provisioning call handling resources as in claim 22 wherein the predetermined criteria further comprises an ANI identifier of the contact.

25. The apparatus for provisioning call handling resources as in claim 22 wherein the predetermined criteria further comprises a source URL of the contact.

26. The apparatus for provisioning call handling resources as in claim 22 wherein the predetermined criteria further comprises an e-mail from the contact.

27. The apparatus for provisioning call handling resources as in claim 22 wherein the contact handling structure further comprises an automatic call distributor.

* * * * *